(12) United States Patent
Li et al.

(10) Patent No.: US 11,032,768 B2
(45) Date of Patent: Jun. 8, 2021

(54) WAKE-UP-FRAME COMMUNICATION OF APPLICATION DATA

(71) Applicant: Apple Inc., Cupertino, CA (US)

(72) Inventors: Guoqing Li, Cupertino, CA (US); Christiaan A. Hartman, San Jose, CA (US); Zheng Zeng, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 16/121,272

(22) Filed: Sep. 4, 2018

(65) Prior Publication Data

US 2019/0075519 A1 Mar. 7, 2019

Related U.S. Application Data

(60) Provisional application No. 62/554,449, filed on Sep. 5, 2017.

(51) Int. Cl.
*H04W 52/02* (2009.01)

(52) U.S. Cl.
CPC ..... *H04W 52/0225* (2013.01); *H04W 52/028* (2013.01); *H04W 52/0219* (2013.01); *H04W 52/0229* (2013.01)

(58) Field of Classification Search
CPC ......... H04W 52/0225; H04W 52/0219; H04W 52/0229; H04W 52/028
See application file for complete search history.

(56) References Cited

U.S. PATENT DOCUMENTS

| 9,974,023 B2 | 5/2018 | Min |
| 2018/0077641 A1* | 3/2018 | Yang ............... H04L 69/22 |
| 2018/0084501 A1 | 3/2018 | Mu |
| 2018/0103431 A1 | 4/2018 | Suh |

FOREIGN PATENT DOCUMENTS

WO    WO2018097684 A1    5/2018

OTHER PUBLICATIONS

U.S. Appl. No. 62/426,843 of Suh et al. US 2018/0103431 A1 (Year: 2016).*

* cited by examiner

*Primary Examiner* — Ian N Moore
*Assistant Examiner* — Brian T Le
(74) *Attorney, Agent, or Firm* — Kowert, Hood, Munyon, Rankin & Goetzel P.C.

(57) ABSTRACT

A recipient electronic device that receives a wake-up frame is described. This recipient electronic device may include an interface circuit that communicates with an electronic device, where the interface circuit includes a main radio and a wake-up radio (WUR) that at least selectively transitions the main radio from a lower-power mode to a higher-power mode. During operation, the WUR receives the wake-up frame intended for the recipient electronic device, where the wake-up frame comprises a payload field with data. For example, the wake-up frame may specify: a total size of the wake-up frame, and/or a size of the payload field. In response to the wake-up frame, the WUR selectively transitions the main radio from the lower-power mode to the higher-power mode. Moreover, the main radio provides an acknowledgment associated with the recipient electronic device that indicates that the recipient electronic device received the wake-up frame.

20 Claims, 8 Drawing Sheets

WAKE-UP-FRAME COMMUNICATION OF APPLICATION DATA

CROSS-REFERENCE TO RELATED APPLICATION

This application claims the benefit of U.S. Provisional Application No. 62/554,449, entitled "Wake-Up Frame Communication of Application Data," by Guoqing Li, et al., filed Sep. 5, 2017, the contents of which are hereby incorporated by reference.

FIELD

The described embodiments relate, generally, to wireless communications among electronic devices, and techniques for selectively communicating application data to a wake-up radio in a wake-up frame.

BACKGROUND

Many electronic devices communicate with each other using wireless local area networks (WLANs), such as those based on a communication protocol that is compatible with an IEEE 802.11 standard (which is sometimes referred to as a 'Wi-Fi'). However, a radio in an electronic device that communicates using wireless communication in a WLAN may consume a significant amount of power.

In order to address this challenge, a new radio technology called Low Power Wake Up Radio is being considered (in the discussion that follows a LP-WUR or WUR is sometimes referred to as a 'wake-up radio'). The wake-up radio may be a companion to the main Wi-Fi radio in the electronic device. Notably, by using the wake-up radio, the electronic device may turn off its main radio and may wake up the main radio in response to the wake-up radio receiving a wake-up radio packet from an access point. For example, the access point may send the wake-up radio packet when there is a down-link packet for the electronic device.

However, waking up the main radio can increase the power consumption of the electronic device and/or increase the latency of the communication.

SUMMARY

A first group of embodiments relates to an electronic device that provides a wake-up frame. This electronic device may include a node that can be communicatively coupled to an antenna, and an interface circuit communicatively coupled to the node and that communicates with a recipient electronic device. During operation, the interface circuit provides the wake-up frame intended for the recipient electronic device, where the wake-up frame includes a payload field with data.

Note that the wake-up frame may have a predefined size.

Moreover, the wake-up frame may specify a total size of the wake-up frame and/or a size of the payload field.

Furthermore, the wake-up frame may include an indicator signaling or that indicates that the payload field is present.

Additionally, the data may include: application data, control information, a transmission control protocol acknowledgement, and/or information associated with a layer in a protocol stack above a physical layer.

In some embodiments, the wake-up frame may specify an expectation for an acknowledgement from the recipient electronic device to the electronic device. For example, the wake-up frame may specify how the acknowledgement is to be communicated by the recipient electronic device. Alternatively or additionally, the wake-up frame may specify that the acknowledgement is to be communicated by the recipient electronic device using a main radio in the recipient electronic device.

Moreover, the wake-up frame may indicate that a main radio in the recipient electronic device transition from a lower-power mode to a higher-power mode.

Furthermore, the electronic device may include an access point.

Additionally, the wake-up frame may be compatible with an IEEE 802.11 communication protocol.

In some embodiments, the interface circuit receives an acknowledgment associated with the recipient electronic device that indicates that the recipient electronic device received the wake-up frame.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a wake-up frame. The method includes at least some of the aforementioned operations performed by the interface circuit in the electronic device.

A second group of embodiments relates to a recipient electronic device that receives a wake-up frame. This recipient electronic device may include a node that can be communicatively coupled to an antenna, and an interface circuit communicatively coupled to the node and that communicates with an electronic device. Moreover, the interface circuit may include a main radio and a wake-up radio (WUR) that at least selectively transitions the main radio from a lower-power mode to a higher-power mode in response to the wake-up frame. During operation, the WUR receives a wake-up frame associated with the electronic device, where the wake-up frame includes a payload field with data.

Moreover, in response to receiving the wake-up frame, the WUR may selectively transition the main radio from the lower-power mode to the higher-power mode. Then, the main radio may provide an acknowledgment intended for the electronic device that indicates that the recipient electronic device received the wake-up frame.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a wake-up frame. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
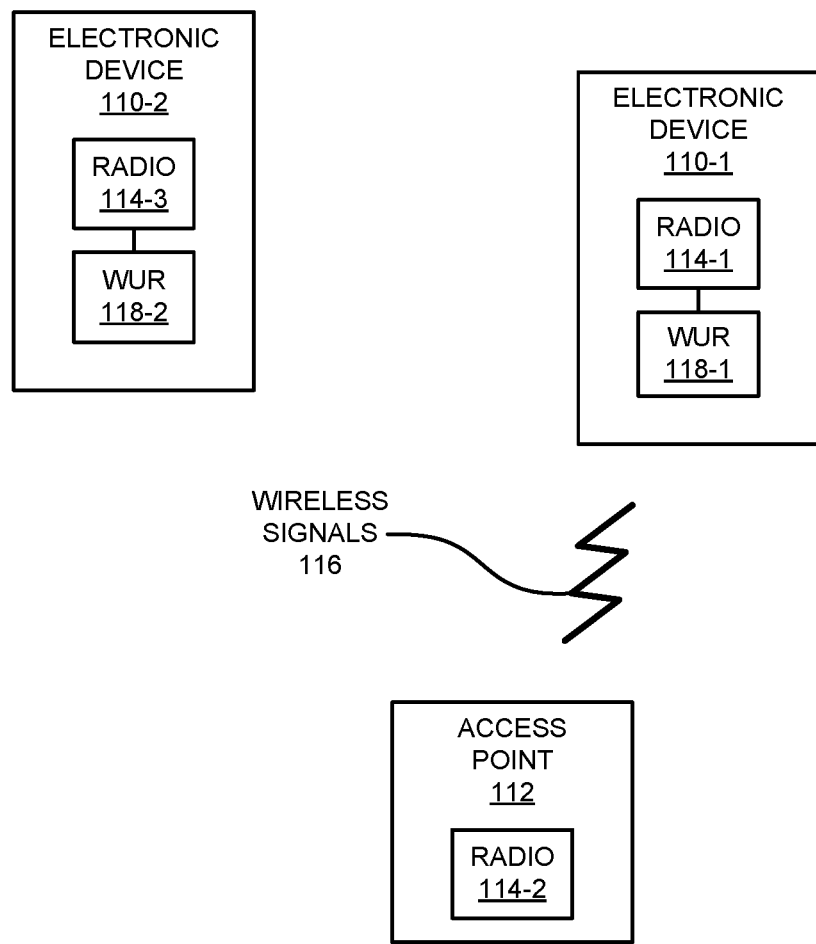
FIG. 1 is a block diagram illustrating an example of electronic devices communicating wirelessly.

A recipient electronic device that receives a wake-up frame is described. This recipient electronic device may include an interface circuit that communicates with an electronic device, where the interface circuit includes a main radio and a wake-up radio (WUR) that at least selectively transitions the main radio from a lower-power mode to a higher-power mode. During operation, the WUR receives the wake-up frame intended for the recipient electronic device, where the wake-up frame comprises a payload field with data. For example, the wake-up frame may specify: a total size of the wake-up frame, and/or a size of the payload field. In response to the wake-up frame, the WUR selectively transitions the main radio from the lower-power mode to the higher-power mode. Moreover, the main radio provides an acknowledgment associated with the recipient electronic device that indicates that the recipient electronic device received the wake-up frame.

By communicating data using the wake-up frame, these communication techniques may facilitate improved communication performance between the electronic device and the recipient electronic device. For example, the communication techniques may reduce the power consumption of the recipient electronic device by reducing the number of times the main radio is transitioned to the higher-power mode. Moreover, the communication techniques may reduce the latency (and, more generally, may improve communication performance) during communication between the electronic device and the recipient electronic device. Consequently, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include WURs 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, transitioning radio 114-1 from the lower-power mode to the higher-power mode increases the power consumption of electronic device 110-1. In addition, this may increase the latency during communication between electronic device 110-1 and access point 112.

In order to address this challenge, access point 112 may provide or communicate data to electronic device 110-1 using a wake-up frame. Thus, WUR 118-1 may receive a wake-up frame from radio 114-2 that includes data in a payload field. Note that the wake-up frame may have a predefined size. Alternatively, the wake-up frame may specify a total size of the wake-up frame and/or a size of the payload field. In some embodiments, the wake-up frame may include an indicator signaling or that indicates that the payload field is present.

Moreover, the data may include: application data, control information, a transmission control protocol acknowledgement, and/or information associated with a layer in a protocol stack above a physical layer.

Furthermore, the wake-up frame may specify an expectation for an acknowledgement from electronic device 110-1 to access point 112. For example, the wake-up frame may specify how the acknowledgement is to be communicated by electronic device 110-1. Alternatively or additionally, the wake-up frame may specify that the acknowledgement is to be communicated by electronic device 110-1 using a main radio (such as radio 114-1) in electronic device 110-1 and/or the wake-up frame may indicate that radio 114-1 in electronic device 110-1 may transition from the lower-power mode to the higher-power mode.

Thus, in response to receiving the wake-up frame, WUR 118-1 may selectively transition radio 114-1 from the lower-power mode to the higher-power mode, and radio 114-2 may transmit or provide the acknowledgment to access point 112. This acknowledgment may indicate that electronic device 110-1 received the wake-up frame.

In these ways, the communication techniques may allow electronic devices 110 and access point 112 to communicate efficiently (such as with low latency) using WURs 118, while significantly reducing the power consumption associated with radios 114 and WURs 118 in electronic devices 110. Notably, electronic device 110-1 may receive data via a wake-up frame. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments the one or more of electronic devices 110 may individually provide acknowledgments to radio 114-2. Thus, radio 114-1 (and, more generally, radios 114 in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
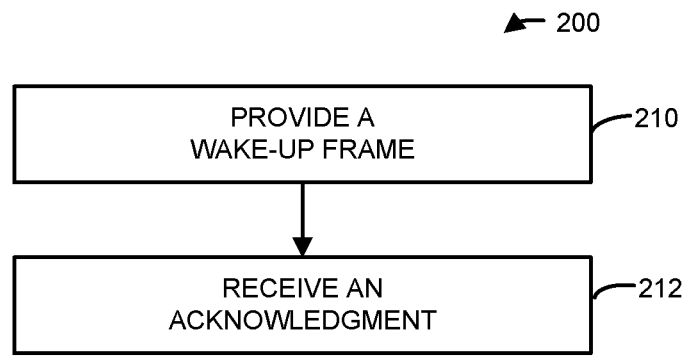
FIG. 2 is a flow diagram illustrating an example of a method for providing a wake-up frame using one of the electronic devices in FIG. 1.

FIG. 2 presents a flow diagram illustrating an example method 200 for providing a wake-up frame. This method may be performed by an electronic device, such as access point 112 in FIG. 1. During operation, the electronic device may provide the wake-up frame (operation 210) intended for the recipient electronic device, where the wake-up frame includes a payload field with data. Note that the wake-up frame may have a predefined size. Alternatively, the wake-up frame may specify a total size of the wake-up frame and/or a size of the payload field. In some embodiments, the wake-up frame may include an indicator signaling or that indicates that the payload field is present.

Moreover, the data may include: application data, control information, a transmission control protocol acknowledgement, and/or information associated with a layer in a protocol stack above a physical layer.

Furthermore, the wake-up frame may specify an expectation for an acknowledgement from the recipient electronic device to the electronic device. For example, the wake-up frame may specify how the acknowledgement is to be communicated by the recipient electronic device. Alternatively or additionally, the wake-up frame may specify that the acknowledgement is to be communicated by the recipient electronic device using a main radio in the recipient electronic device and/or the wake-up frame may indicate that the main radio in the recipient electronic device may transition from the lower-power mode to the higher-power mode.

Then, in response to providing the wake-up frame, the electronic device may optionally receive the acknowledgment (operation 212) associated with the recipient electronic device that indicates that the recipient electronic device received the wake-up frame.

Note that the electronic device may include an access point.

Moreover, the wake-up frame may be compatible with an IEEE 802.11 communication protocol.

Figure 3:
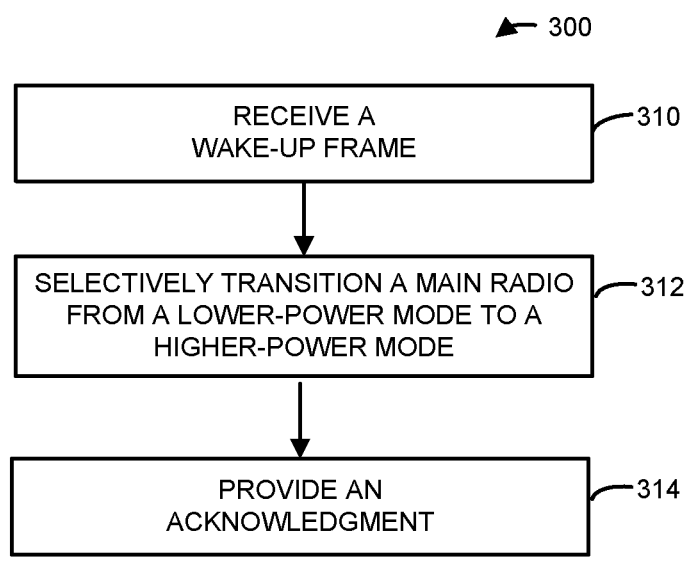
FIG. 3 is a flow diagram illustrating an example of a method for receiving a wake-up frame using one of the electronic devices in FIG. 1.

FIG. 3 presents a flow diagram illustrating an example method 300 for receiving a wake-up frame. This method may be performed by a recipient electronic device, such as electronic device 110-1 in FIG. 1. The recipient electronic device may include a main radio and a WUR that selectively transitions the main radio from a lower-power mode to a higher-power mode. During operation, the recipient electronic device may receive, using the WUR, a wake-up frame (operation 310) associated with an electronic device, where the wake-up frame includes a payload field with data. Then, the WUR may selectively transition the main radio from the lower-power mode to the higher-power mode (operation 312) based at least in part on the wake-up frame. Moreover, the main radio may optionally provide an acknowledgment (operation 314) intended for the electronic device that indicates that the recipient electronic device received the wake-up frame.

In some embodiments of methods 200 (FIG. 2) and/or 300, there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2) and/or 300 are, at least in part, performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

Figure 4:
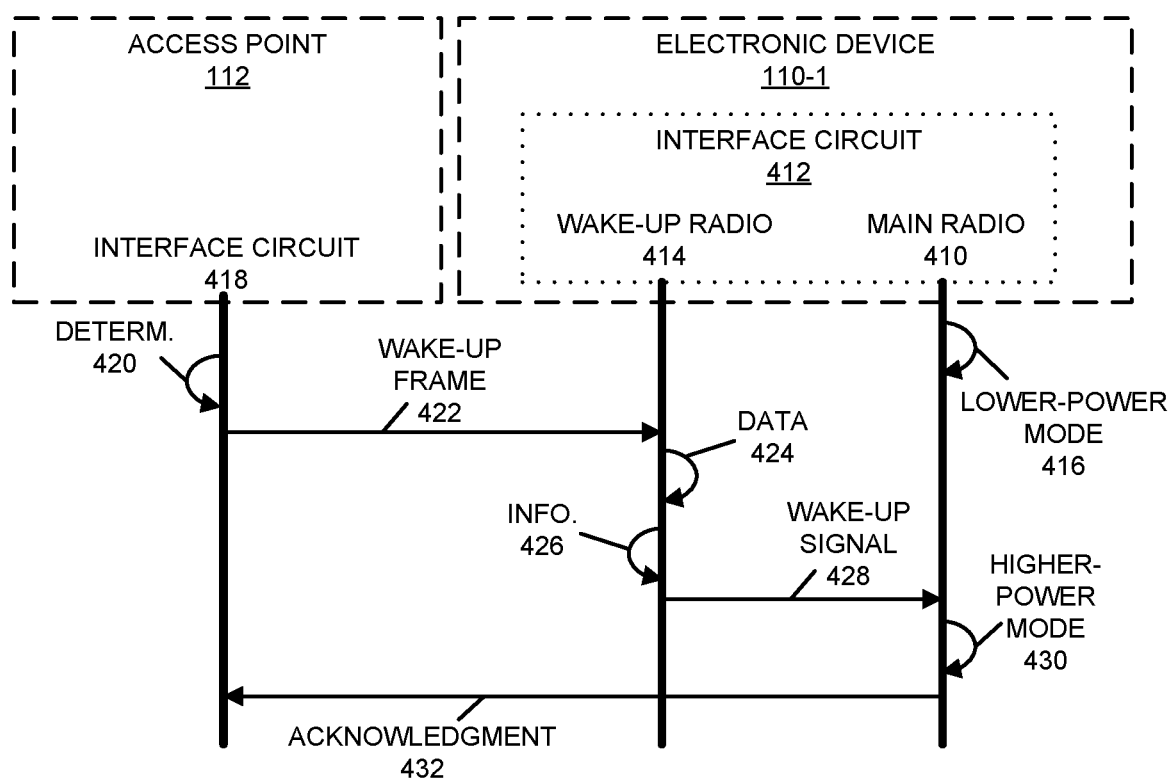
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. After associating with access point 112, main radio 410 in interface circuit 412 in electronic device 110-1 may transition to a lower-power mode 416.

Next, interface circuit 418 may determine 420 to provide wake-up frame 422 for a WUR 414 (such as WUR 118-1) in interface circuit 412. For example, interface circuit 418 may determine 420 to provide wake-up frame 422 when there is downlink traffic (such as data associated with a service) for electronic device 110-1. Note that wake-up frame 422 may include data 424.

After receiving wake-up frame 422, WUR 414 may extract and analyze information 426 associated with wake-up frame 422 and/or data 424.

Then, WUR 414 may selectively perform a remedial action. For example, WUR 414 may provide, to main radio 410, a wake-up signal 428 that transitions main radio 410 from lower-power mode 416 to a higher-power mode 430 based at least in part on information 426.

Moreover, main radio 410 may provide an acknowledgment 432 to access point 112.

While communication between the components in FIG. 4 is illustrated with unilateral or bilateral communication (e.g., lines having a single arrow or dual arrows), in general a given communication operation may be unilateral or bilateral.

In some embodiments of the WUR technology, the communication techniques are used to communicate data and/or other information to a WUR. Notably, if a recipient electronic device transitions a main radio from a lower-power mode to a higher-power mode in response to receiving a wake-up frame from an access point, the latency and/or the power consumption of the recipient electronic device may be increased.

In order to address this challenge, a WUR in a recipient electronic device may receive data and/or other information (such as data in a payload) in a wake-up frame from an access point. Subsequently, after the WUR selectively transitions a main radio from a lower-power mode to a higher-power mode in response to the wake-up frame, the main radio may provide an acknowledgment.

Figure 5:
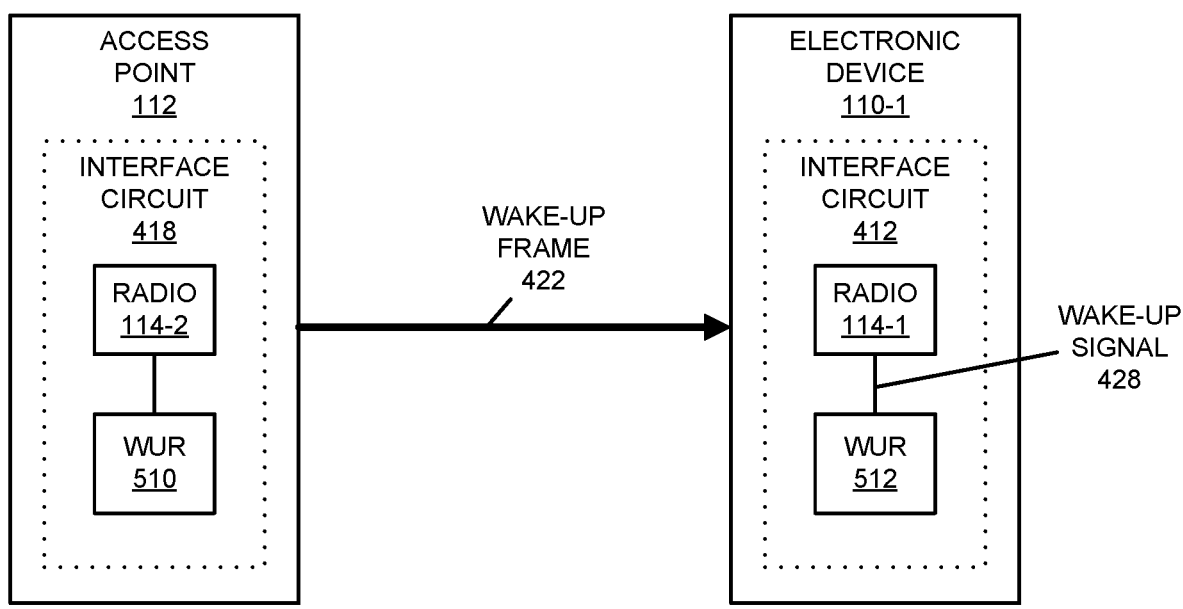
FIG. 5 is a drawing illustrating an example interface circuit in one of the electronic devices in FIG. 1.

As shown in FIG. 5, which presents a drawing illustrating an example of an interface circuit 412 in electronic device 110-1, a WUR 512 (such as WUR 414) may be a companion radio to a main (Wi-Fi) radio 114-1 in interface circuit 412. WUR 512 may allow electronic device 110-1 to turn off main radio 114-1, e.g., whenever possible. Moreover, WUR 512 may receive data in a wake-up frame 422 (or a wake-up packet), sent from optional WUR 510 or radio 114-2 in access point 112.

Note that in some embodiments WUR 512 is configured to receive wireless signals, while main radio 114-1 is configured to transmit and receive wireless signals when it is in the higher-power mode. In these ways, the power consumption of WUR 512 may be very low, e.g., lower than Bluetooth Low Energy. WUR 512 can operate in an always-on mode and/or in a duty-cycle mode. For example, in the duty-cycle mode, WUR 512 may turn on or listen for a wake-up frame from access point 112 based at least in part on a predefined schedule of electronic device 110-1 (such as a targeted wake-up-time schedule).

The design objective for IEEE 802.11ba is to have an ultra-low power receiver (e.g., the WUR) at a recipient electronic device (which is sometimes referred to as a 'station' or STA, and which is other than an access point) to receive wake-up frames or packets from an access point, or another recipient electronic device (e.g., in peer to peer communications). In some proposals for IEEE 802.11ba, transmission from the access point to the recipient electronic device may be unidirectional. Subsequent transmissions from the recipient electronic device to the access point may use the main radio. Moreover, in these proposals, the WUR frame may be used to wake up the main radio in the recipient electronic device. Consequently, in these proposals the WUR frame does not carry any application data.

For example, one such use case is peer-to-peer device discovery. In peer-to-peer discovery, the initial discovery of electronic devices usually involves information exchange in both directions (bidirectional communication). However, some IEEE 802.11ba proposals may only allow an access point to send packet to recipient electronic device(s). This unidirectional communication may constrain the use of IEEE 11ba in peer-to-peer operations, e.g., because the recipient electronic device may have to wake up the main radio in order to send back the initial discovery information to the access point or to another recipient electronic device or device. Consequently, peer-to-peer operation may consume more power than operation according to IEEE 802.11ba. In addition, sometimes an access point may deliver information to a recipient electronic device that needs or requires an acknowledgement, but for which the recipient electronic device does not need to wake up the main radio. For example, an application-configuration message may be delivered to the recipient electronic device for which the recipient electronic device does not need to take further action except acknowledging the receipt of the information. In some IEEE 802.11ba proposals, the recipient electronic device may have to wake up the main radio to acknowledge the receipt of the information, which may increase latency (e.g., wake-up latency) and which may increase the power consumption of the recipient electronic device.

Figure 6:
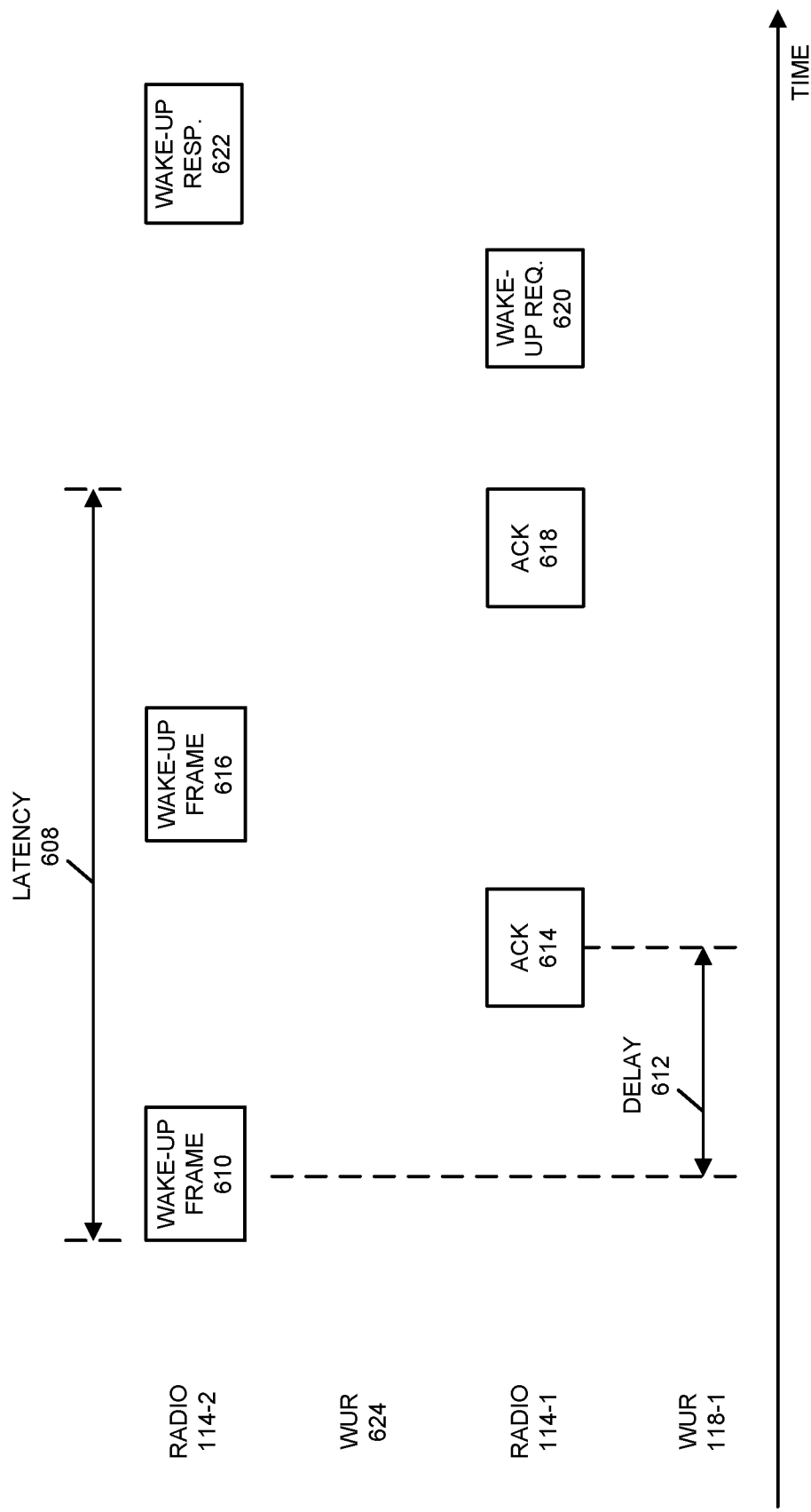
FIGS. 6 and 7 are flow diagrams illustrating examples of communication between electronic devices, such as the electronic devices of FIG. 1.
Figure 7:
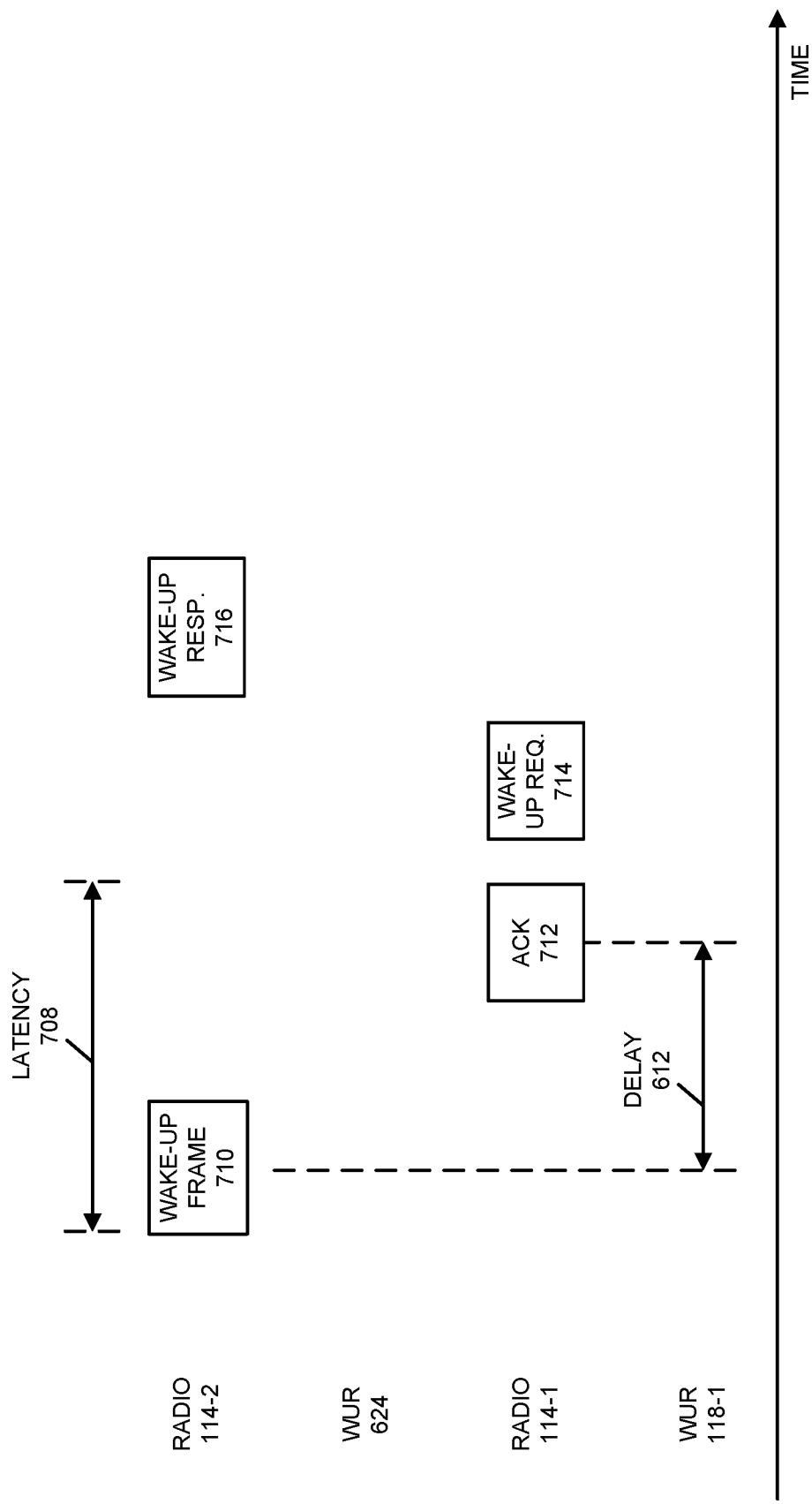

These challenges and an embodiment of a proposed communication techniques are illustrated in FIGS. 6 and 7, which present flow diagrams illustrating examples of communication between electronic device 110-1 and access point 112. Notably, as shown in FIG. 6, in some IEEE 802.11ba proposals radio 114-2 in access point 112 (such as a radio that is compatible with IEEE 802.11ba) may transmit a wake-up frame 610 to WUR 118-1 in electronic device 110-1. After a wake-up delay 612, the main radio (such as radio 114-1) in electronic device 110-1 may transmit an acknowledgement (ACK) 614 to access point 112. Then, radio 114-2 in access point 112 may transmit data 616 (such as application data) to radio 114-1 in electronic device 110-1. After receiving the data 616, radio 114-1 in electronic device 110-1 may transmit an acknowledgment 618 to radio 114-2 in access point 112, which sent wake-up frame 610. Note that the overall latency 608 for delivering data 616 starts with the transmission of wake-up frame 610 and ends with receipt of acknowledgment 618.

Next, radio 114-2 in electronic device 110-1 may transmit a WUR request 620 to radio 114-2 in access point 112, which indicates that electronic device 110-1 is transitioning back to a low-power mode (e.g., using WUR 118-1). In response, radio 114-1 in access point 112 may transmit a WUR response 622 to radio 114-1 in electronic device 110-1. Note that in some embodiments access point 112 includes WUR 624, which may perform some or all of the operations performed by radio 114-2.

In contrast, in the communication techniques illustrated in FIG. 7, radio 114-2 in access point 112 (such as a radio that is compatible with IEEE 802.11ba) may transmit a wake-up frame 710 that selectively includes data (such as application data). In response, WUR 118-1 in electronic device 110-1 may wake-up the main radio (such as radio 114-1), which then may transmit an acknowledgment 712 to access point 112. Note that the overall latency 708 for delivering the data starts with the transmission of wake-up frame 710 and ends with receipt of acknowledgment 712.

Next, radio 114-1 in electronic device 110-1 may transmit a WUR request 714 to radio 114-2 in access point 112, which indicates that electronic device 110-1 is transitioning back to a low-power mode (e.g., using WUR 118-1). In response, radio 114-2 in access point 112 may transmit a WUR response 716 to radio 114-1 in electronic device 110-1.

Consequently, in the communication techniques, radio 114-1 in electronic device 110-1 may be operating for less time, which may reduce the power consumption of electronic device 110-1 and the total channel time used to receive the data from access point 112.

Thus, in order to enable more-efficient use of IEEE 802.11ba, in the communication techniques the wake-up frame may selectively carry or convey data, such as application data.

Figure 8:
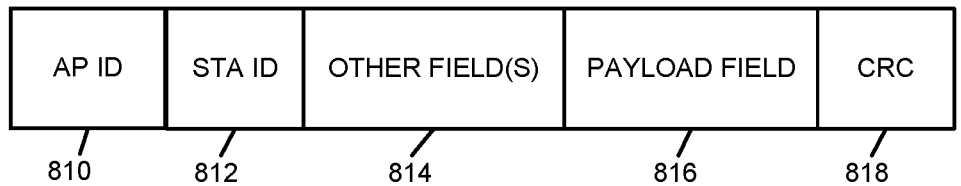
FIG. 8 is a drawing illustrating an example of a wake-up frame during communication between electronic devices, such as the electronic devices of FIG. 1.

FIG. 8 presents a drawing illustrating an example of a wake-up frame 800 during communication between electronic device 110-1 and access point 112. Wake-up frame 800 may include: an access-point (AP) identifier (ID) 810, a STA identifier 812, one or more other fields 814, an optional payload field 816 and a cyclic redundancy check (CRC) 818. Note that in some embodiments of wake-up frame 800, the order of items can vary and additional and/or different items can be included.

As noted previously, in previous proposals for a wake-up frame format, the wake-up frame does not include a payload field because it is not designed to carry or convey data, e.g., from an upper protocol layer, such as application data. In the described communication techniques, wake-up frame 800 or packet may include the optional payload field 816. Note that payload field 816 may be optional because not all wake-up frames may carry or convey data. Various options may be used for the signaling of the payload field. For example, a type (or subtype) field may be defined in the packet header and there may be one or more special type (or subtype) values to indicate the presence of the optional payload.

Moreover, a length of the payload field 816 may be signaled or indicated in a variety of ways. Notably, different type/subtype values may indicate a different fixed payload size. For example, a type 1 packet may contain a 20B payload, a type 2 packet may contain a 10B payload, etc. Alternatively or additionally, a length field may indicate a size of the payload or the total packet size (in which case, the payload size can be calculated from the total packet size minus the size of other fields).

Furthermore, in order to communicate to a recipient electronic device that it needs to (or is requested to) acknowledge receipt of a wake-up frame (or not), an acknowledgement indication may be defined in the wake-up-frame or packet format. For example, if a bit in a field is set to '1,' then the recipient electronic device may return an acknowledgment. Alternatively, if a bit in a field is set, e.g., to '0,' then the recipient electronic device may determine not to return an acknowledgment (e.g., as an acknowledgment is not requested). Note that the acknowledgement indication may indicate or specify the acknowledgement technique, such as using the main radio in the recipient electronic device.

Additionally, when the wake-up frame is used to carry or convey data, the data may be included in the optional payload field. In some embodiments, there may be different data-carrying modes. For example, in some unicast modes, the recipient electronic device may transmit an acknowledgement to the access point after receiving the wake-up frame. Alternatively, in other unicast modes, the recipient electronic device may not transmit an acknowledgement to the access point after receiving the wake-up frame. Additionally, some multicast modes, there may not be an acknowledgement from the recipient electronic device to the access point when multicast data is received. Note that the data-carrying mode may be indicated or specified in the wake-up frame or packet, e.g., using a flag, field, or other mechanism or techniques.

In summary, in the described communication techniques a wake-up frame or packet may be used to carry or convey data, such as application data. The wake-up frame or packet may be used to carry information from an upper software layer, such as a transmission control protocol (TCP) acknowledgment. In order to support this concept, an optional payload field in a wake-up frame or packet and associated signaling may be used. In addition, the wake-up frame may specify an acknowledgement indication and/or a data-carrying mode. This capability may reduce latency during communication between the electronic device and the recipient electronic device and/or may reduce power consumption of the recipient electronic device.

We now describe embodiments of an electronic device. FIG. 9 presents a block diagram of an electronic device 900 (which may be a cellular telephone, an access point, another electronic device, etc.) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, graphics processing units (GPUs), programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: program instructions or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
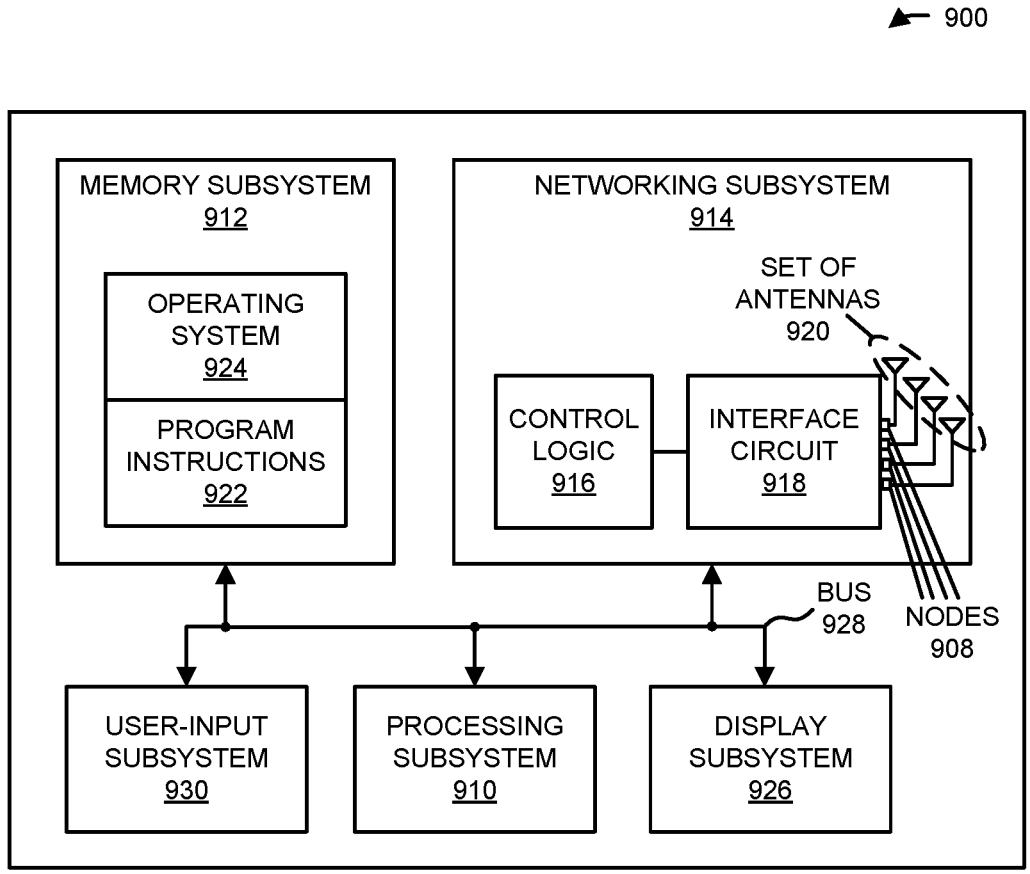
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 914 includes one or more radios, such as a WUR that is used to receive wake-up frames and/or to provide acknowledgments and/or data, and a main radio that is used to transmit and/or to receive frames or packets during a higher-power mode. The WUR and the main radio may be implemented separately (such as using discrete components or separate integrated circuits) or in a common integrated circuit.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or frame frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the sub systems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918. In some embodiments, the communication techniques are implemented, at least in part, in a MAC layer and/or in a physical layer in interface circuit 918.

While examples of numerical values are provided in the preceding discussion, in other embodiments different numerical values are used. Consequently, the numerical values provided are not intended to be limiting.

While the preceding embodiments illustrated the use of a wake-up frame and an acknowledgment that are communicated using Wi-Fi, in other embodiments of the communication techniques Bluetooth Low Energy is used to communicate one or more of these frames or packets. Furthermore, the wake-up frame and/or the acknowledgment may be communicated in the same or a different band of frequencies that the band(s) of frequencies used by the main radio. For example, the wake-up frame and/or the acknowledgment may be communicated in one or more bands of frequencies, including: 900 MHz, 2.4 GHz, 5 GHz, 60 GHz, and/or a band of frequencies used by LTE.

While the WUR in the recipient electronic device was illustrated as receiving frames or packets (such as the wake-up frame), in some embodiments the recipient electronic device is also capable of transmitting a frame or a packet, such as an acknowledgment to an access point. This capability may allow the recipient electronic device to respond following receipt of a wake-up frame without selectively transitioning a main radio from a lower-power mode to a higher-power mode.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A recipient electronic device, comprising:
a connector or pad configured to communicatively couple to an antenna; and
an interface circuit, communicatively coupled to the connector or the pad, configured to communicate with an electronic device, wherein the interface circuit comprises a main radio and a wake-up radio (WUR) that at least selectively transitions the main radio from a lower-power mode to a higher-power mode, and wherein the interface circuit is configured to:
receive, from the connector or the pad and using the WUR, a wake-up frame intended for the recipient electronic device, wherein the wake-up frame comprises a payload field with data, wherein the wake-up frame specifies at least one of: a total size of the wake-up frame, or a size of the payload field, and wherein the wake-up frame specifies an expectation for an acknowledgement from the recipient electronic device to the electronic device to be communicated using the main radio.

2. The recipient electronic device of claim 1, wherein the wake-up frame has a predefined size.

3. The recipient electronic device of claim 1, wherein the wake-up frame indicates that the payload field is present.

4. The recipient electronic device of claim 1, wherein the data comprises:
application data, control information, a transmission control protocol acknowledgement, or information associated with a layer in a protocol stack above a physical layer.

5. The recipient electronic device of claim 1, wherein the wake-up frame specifies how the acknowledgement is to be communicated by the recipient electronic device.

6. The recipient electronic device of claim 1, wherein the wake-up frame indicates that the main radio in the recipient electronic device transition from the lower-power mode to the higher-power mode.

7. The recipient electronic device of claim 1, wherein the wake-up frame is compatible with an IEEE 802.11 communication protocol; and
wherein the IEEE 802.11 communication protocol comprises one or more of: IEEE 802.11a; IEEE 802.11b; IEEE 802.11g; IEEE 802.11-2007; IEEE 802.11n; IEEE 802.11-2012;
IEEE 802.11ac; IEEE 802.11ax; or IEEE802.11be.

8. A non-transitory computer-readable storage medium for use in conjunction with a recipient electronic device, the non-transitory computer-readable storage medium storing program instructions that, when executed by the recipient electronic device, cause the recipient electronic device to carry out one or more operations comprising:
receiving, using a wake-up radio (WUR), a wake-up frame intended for the recipient electronic device, wherein the recipient electronic device comprises a main radio and the WUR configured to at least selectively transition the main radio from a lower-power mode to a higher-power mode, wherein the wake-up frame comprises a payload field with data, wherein the wake-up frame specifies at least one of: a total size of the wake-up frame, or a size of the payload field, and wherein the wake-up frame specifies an expectation for an acknowledgement from the recipient electronic device to the electronic device to be communicated using the main radio.

9. The non-transitory computer-readable storage medium of claim 8, wherein the wake-up frame has a predefined size.

10. The non-transitory computer-readable storage medium of claim 8, wherein the wake-up frame indicates that the payload field is present.

11. The non-transitory computer-readable storage medium of claim 8, wherein the data comprises: application data, control information, a transmission control protocol acknowledgement, or information associated with a layer in a protocol stack above a physical layer.

12. The non-transitory computer-readable storage medium of claim 8, wherein the wake-up frame specifies how the acknowledgement is to be communicated by the recipient electronic device.

13. The non-transitory computer-readable storage medium of claim 8, wherein the wake-up frame indicates that the main radio in the recipient electronic device transition from the lower-power mode to the higher-power mode.

14. A method for receiving a wake-up frame, comprising:
by a recipient electronic device that comprises a main radio and a wake-up radio (WUR) configured to at least selectively transition the main radio from a lower-power mode to a higher-power mode:
receiving, using the WUR, the wake-up frame intended for the recipient electronic device, wherein the wake-up frame comprises a payload field with data and specifies an expectation for an acknowledgement, communicated using the main radio, from the recipient electronic device to the electronic device;
selectively transitioning the main radio from the lower-power mode to the higher-power mode based at least in part on the wake-up frame; and
providing, using the main radio, the acknowledgment associated with the recipient electronic device that indicates that the recipient electronic device received the wake-up frame, wherein the wake-up frame specifies at least one of: a total size of the wake-up frame, or a size of the payload field, and wherein the wake-up frame specifies an expectation for an acknowledgement from the recipient electronic device to the electronic device to be communicated using the main radio.

15. The method of claim 14, wherein the wake-up frame indicates that the payload field is present.

16. The method of claim 14, wherein the wake-up frame has a predefined size.

17. The recipient electronic device of claim 1, wherein the total size of the wake-up frame indirectly specifies or the size of the payload field directly specifies a variable size of the payload field.

18. The non-transitory computer-readable storage medium of claim 8, wherein the total size of the wake-up frame indirectly specifies or the size of the payload field directly specifies a variable size of the payload field.

19. The method of claim 14, wherein the total size of the wake-up frame indirectly specifies or the size of the payload field directly specifies a variable size of the payload field.

20. The method of claim 14, wherein the wake-up frame specifies how the acknowledgement is to be communicated by the recipient electronic device.

* * * * *